United States Patent
Yamada et al.

(10) Patent No.: US 8,593,913 B2
(45) Date of Patent: Nov. 26, 2013

(54) MAGNETIC RECORDING DEVICE, CONTROLLER THEREOF, AND MAGNETIC RECORDING METHOD

(75) Inventors: Yuichi Yamada, Higashiyamato (JP); Akihiko Takeo, Kunitachi (JP); Hiroshi Isokawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 81 days.

(21) Appl. No.: 13/284,293

(22) Filed: Oct. 28, 2011

(65) Prior Publication Data

US 2012/0134245 A1 May 31, 2012

(30) Foreign Application Priority Data

Nov. 30, 2010 (JP) ................................. 2010-267834

(51) Int. Cl.
*G11B 11/00* (2006.01)

(52) U.S. Cl.
USPC .................. 369/13.24; 369/13.26; 360/59

(58) Field of Classification Search
USPC .......... 369/13.33, 13.32, 13.24, 13.14, 13.03, 369/13.02, 13.12, 13.13, 13.01, 13.35, 369/13.17, 112.27, 13.26; 360/59, 125.31, 360/125.74, 125.75

See application file for complete search history.

(56) References Cited

U.S. PATENT DOCUMENTS

| | | | |
|---|---|---|---|
| 4,712,203 A | 12/1987 | Saito et al. | |
| 8,391,107 B2 * | 3/2013 | Gage et al. | 369/13.26 |
| 2008/0204916 A1 * | 8/2008 | Matsumoto et al. | 360/59 |
| 2009/0296256 A1 * | 12/2009 | Tsuyama | 360/59 |
| 2011/0122737 A1 * | 5/2011 | Shimazawa et al. | 369/13.24 |
| 2012/0008470 A1 * | 1/2012 | Shimazawa et al. | 369/13.24 |

FOREIGN PATENT DOCUMENTS

| | | |
|---|---|---|
| JP | 06-019863 B | 3/1994 |
| JP | 2002-100050 A | 4/2002 |
| JP | 2006-277859 A | 10/2006 |

* cited by examiner

*Primary Examiner* — Ali Neyzari
(74) *Attorney, Agent, or Firm* — Knobbe, Martens, Olson & Bear, LLP

(57) ABSTRACT

According to one embodiment, a magnetic recording device includes: a magnetic recording medium provided with data regions for data recording; a light output module which outputs an optical signal to be applied to a recording position where recording data is recorded of the data regions; a write head which records the recoding data at the recording position magnetically; a light quantity setting module which sets a light quantity value of the optical signal output from the light output module; a heat-assisted recording controller which performs a control so that the recording data is recorded by the write head at the recording position which is heat-assisted by applying an optical signal with the set light quantity value; and a controller which adjusts the light quantity value of the optical signal set by the light quantity setting module using the recording position being a part of the data regions.

20 Claims, 8 Drawing Sheets

MAGNETIC RECORDING DEVICE, CONTROLLER THEREOF, AND MAGNETIC RECORDING METHOD

CROSS REFERENCE TO RELATED APPLICATION(S)

The application is based upon and claims the benefit of priority from Japanese Patent Application No. 2010-267834 filed on Nov. 30, 2010, the entire content of which are incorporated herein by reference.

FIELD

Embodiments described herein relate generally to a magnetic recording device which records information magnetically with assistance of heat that is generated optically, as well as to a controller thereof and a magnetic recording method.

BACKGROUND

In recent years, the information recording density of recording media used in magnetic recording devices such as magnetic disk devices (HDDs) has become increasingly high. As the recording density increases, the probability of occurrence of magnetic interference called thermal fluctuation that a recording portion interferes with an adjacent portion of the recording portion becomes higher. In order to prevent magnetic interference, a recording medium may be used in which a recording film is made of a material that is high in coercive force at ordinary temperature. In order to record information on the recording film, a technique has been developed that makes it possible to lower the coercive force at a recording position by increasing the temperature of the recording position with optical heat assistance, thereby to record magnetically the information. This information recording technique is called heat-assisted recording.

In the heat-assisted recording, the quantity of light applied to a recording position is required to be controlled to within a prescribed range. To control the quantity of light applied to the recording position to within a prescribed range, it is necessary to optimize the quantity of light emitted from a light-emitting element at least before recording of information. The light quantity optimization needs to be performed in not only the heat-assisted recording in the magnetic recording devices but also information recording in optical information recording devices which use an optical disc as a recording medium. For example, it is known that light quantity optimization processing called optical power control (OPC) is performed in the case of optical information recording devices using an optical disc. However, few light quantity optimization techniques for the heat-assisted recording in magnetic recording devices are known.

According to the related art, in the entire recording area of a recording medium, a recording area for light quantity optimization processing is provided independently of a data recording area. Therefore, a sufficient data recording area cannot be secured in the entire recording area of a recording medium.

DETAILED DESCRIPTION OF THE EMBODIMENTS

In general, according to one exemplary embodiment, a magnetic recording device includes: a magnetic recording medium provided with data regions for data recording; a light output module which outputs an optical signal to be applied to a recording position where recording data is recorded of the data regions; a write head which records the recoding data at the recording position magnetically; a light quantity setting module which sets a light quantity value of the optical signal output from the light output module; a heat-assisted recording controller which performs a control so that the recording data is recorded by the write head at the recording position which is heat-assisted by applying an optical signal with the set light quantity value; and a controller which adjusts the light quantity value of the optical signal set by the light quantity setting module using the recording position being a part of the data regions.

Embodiments will be hereinafter described with reference to the drawings.

Figure 1:
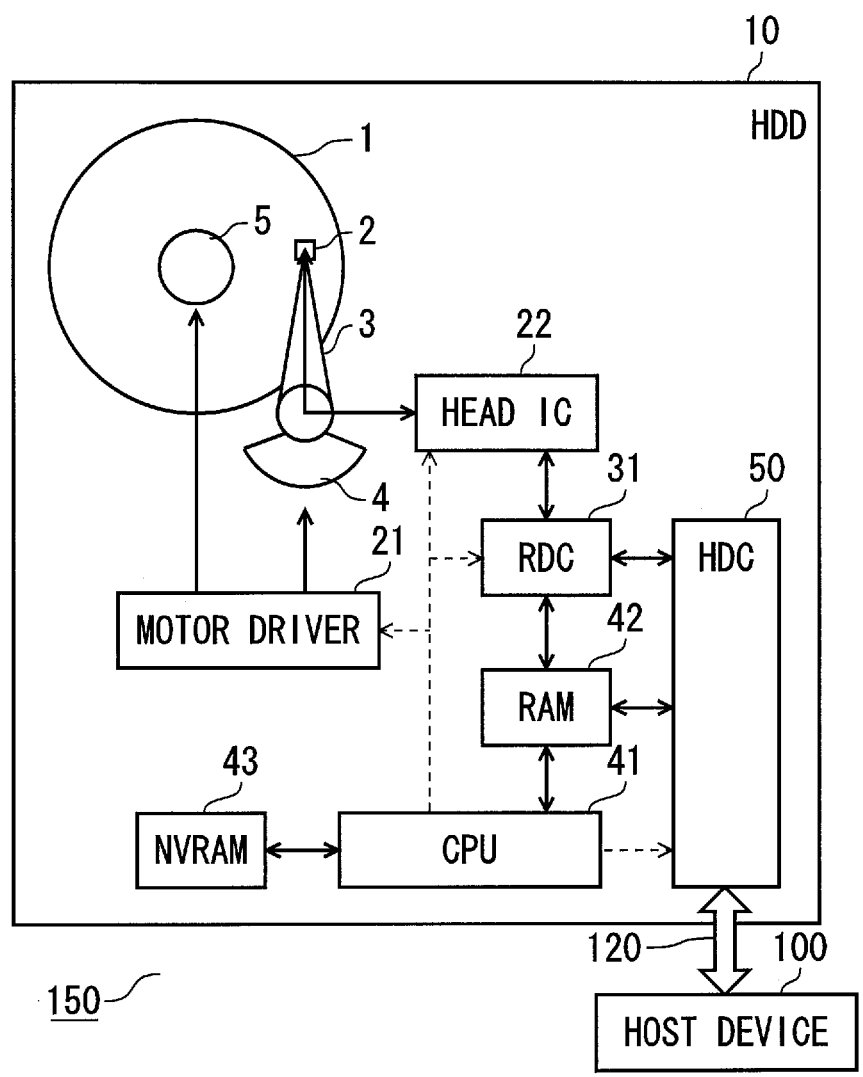
FIG. 1 is a block diagram showing a configuration of an electronic apparatus which is provided with a magnetic disk device (HDD) as a magnetic recording device according to embodiments.

FIG. 1 is a block diagram showing a configuration of an electronic apparatus 150 which is provided with a magnetic disk device (hereinafter also referred to as HDD) 10 which is a magnetic recording device according to the embodiments. The electronic apparatus 150 is also provided with a host device 100. The HDD 10 is connected to the host device 100 through a communication medium (a host interface (I/F)) 120 and functions as a storage module for the host device 100. A host interface (I/F) 120 connects the host device 100 and the HDD 10 and is used for a communication for exchange of data and a command between the host device 100 and the HDD 10. For example, the electronic apparatus 150 is a personal computer and the host device 100 is a central processing unit (CPU) provided in the personal computer.

The HDD 10 is provided with mechanism units such as a magnetic disk 1, a head 2, an arm 3, a voice coil motor (VCM) 4, and a spindle motor (SPM) 5. The HDD 10 is also provided with circuit blocks such as a motor driver 21, a head IC 22, a read/write channel IC (hereinafter also referred to as RDC) 31, a CPU 41, a RAM 42, an NVRAM 43, and an hard disk controller (HDC) 50.

In the HDD 10, information is recorded on the magnetic disk 1 by heat-assisted recording. The heat-assisted recording is a technique which is applied to recording of information on a recording medium in which a recording film is made of a material that is high in coercive force at ordinary temperature. In order to record information on such a recording film, the heat-assisted recording makes it possible to lower the coercive force at a recording position by increasing the temperature of the recording position with optical heat assistance, thereby to record magnetically the information. In the HDD 10, light quantity optimization processing for enabling efficient use of the recording area of the magnetic disk 1 is performed before a start of an information recording operation by the heat-assisted recording. As such, the HDD 10 can record more information on the entire recording area of the magnetic disk 1 by employing the heat-assisted recording.

The magnetic disk 1 is fixed to the SPM 5, and the magnetic disk 1 is rotated as the SPM 5 is driven. At least one surface of the magnetic disk 1 is a recording surface on which information is recorded magnetically. Tracks are defined on the recording surface and are provided with servo regions where servo information is recorded and data regions where data are recorded.

The head 2 is mounted on the arm 3 at one end so as to be corresponded to the recording surface of the magnetic disk 1. The head 2 is provided with a recording portion which is used for information recording on the magnetic disk 1 and a reading portion which is used for information reading from the magnetic disk 1. The reading portion outputs, to the head IC 22, a read signal that has been read from the magnetic disk 1. The recording portion outputs signals corresponding to a write signal that is input from the head IC 22 and thereby records information on the magnetic disk 1. In the HDD 10 being described, signals for information recording on the magnetic disk 1 include a magnetic signal and an optical signal. The head 2 outputs, to the head IC 22, a monitor signal corresponding to the light quantity of an output optical signal of the recording portion. A detailed structure of the head 2 will be described later with reference to FIG. 2.

The arm 3 is provided with the head 2 at its one end and is provided with a bearing portion (not shown) at the other end. The arm 3 is rotated with the bearing portion as a rotation center according to a drive current that is supplied to the VCM 4, and thereby moves the head 2 in a radial direction over the recording surface of the magnetic disk 1.

The VCM 4 is driven according to a drive signal (current) supplied from the motor driver 21 and thereby rotates the arm 3. The SPM 5 is driven according to a drive signal (current) supplied from the motor driver 21 and thereby rotates the magnetic disk 1.

Under control by the CPU 41, the motor driver 21 supplies the VCM 4 with a drive signal (current) for driving the VCM 4 and supplies the SPM 5 with a drive signal (current) for driving the SPM 5.

The head IC 22 amplifies a read signal that is input from the reading portion of the head 2, and outputs an amplified read signal to the RDC 31 as read information. The head IC 22 outputs, to the reading portion of the head 2, according to a servo gate signal that is input from the RDC 31, a write signal corresponding to write information that is also input from the RDC 31. In the embodiments, a write signal is a signal on which the head 2 outputs a magnetic signal and an optical signal. The head IC 22 amplifies a monitor signal that is input from the head 2 and outputs an amplified monitor signal to the RDC 31 as monitor information.

The RDC 31 decodes read information received from the head IC 22 by performing prescribed processing on the read information, and outputs resulting decoded information to the HDC 50. The RDC 31 encodes recording subject information received from the HDC 50 by performing prescribed processing on the recording subject information, and outputs resulting coded information to the head IC 22 as write information. The RDC 31 extracts position information indicating a position on the recording surface of the magnetic disk 1 from servo information that is included in read information, and outputs the extracted position information to the CPU 41. Furthermore, the RDC 31 generates a servo gate signal for discrimination between a servo region and a data region based on received read information, and outputs the generated servo gate signal to the head IC 22. The RDC 31 uses the RAM 42 as a work memory in performing prescribed processing for coding or decoding. In the embodiments, the RDC 31 performs processing of optimizing the quantity of light to be output from the head 2 by adjusting write information for an optical signal to be output based on monitor information received from the head 2 and outputting adjusted write information to the head 2. That is, the RDC 31 functions as a controller for information recording on the magnetic disk 1.

The CPU 41 is a processor for controlling the individual blocks of the HDD 10 according to programs stored in the NVRAM 43. The CPU 41 controls operations of rotating the VCM 4 and the SPM 5. The CPU 41 also controls processing which is performed according to a command that is input from the HDC 50. For example, when receiving command information (write command) containing a logical address where to start data recording and a recording data length from the HDC 50, the CPU 41 extracts the logical address and the recording data length from the received command information. Then, the CPU 41 controls processing relating to information recording on the magnetic disk 1 by the RDC 31 and the head IC 22 based on the extracted logical address and recording data length. Furthermore, the CPU 41 identifies a physical address on the recording surface of the magnetic disk 1 based on position information that is input from the RDC 31. The physical address is physical address information assigned to a servo region that is provided in a track defined on the recording surface of the magnetic disk 1. In running a program, the CPU 41 uses the RAM 42 as a work memory. In the embodiments, the CPU 41 controls the RDC 31 and the head IC 22 so that information is recorded properly in an intended data region based on the identified address information according to a program for controlling the heat-assisted recording processing.

The RAM 42 is a work memory for the RDC 31, the CPU 41, and the HDC 50, and is a DRAM which is a volatile memory.

The NVRAM 43 is a nonvolatile memory for storing programs to be run by the CPU 41. The programs stored in the NVRAM 43 can be updated. In the embodiments, the NVRAM 43 stores the program for controlling the heat-assisted recording processing.

The HDC 50 performs communication processing for exchanging information with the host device 100. The HDC 50 encodes decoded information that is input from the RDC 31 by performing prescribed processing on the decoded information, and sends resulting coded information to the host device 100 as transmission information. Furthermore, the HDC 50 decodes reception information received from the host device 100 by performing prescribed processing on the reception information, and outputs resulting decoded information to the RDC 31 as recording subject information. For example, the HDC 50 performs, with the host device 100, communication processing that complies with the serial advanced technology attachment (SATA) standard. The HDC 50 outputs, to the CPU 41, command information received from the host device 100.

Information is recorded on the magnetic disk 1 by the heat-assisted recording by means of the plural blocks of the HDD 10 having the above-described configuration. Further, light quantity optimization processing for enabling efficient use of the recording area of the magnetic disk 1 is performed before a start of information recording processing by heat-assisted recording. That is, in the HDD 10 according to the embodiments, more information can be recorded on the entire recording area of the magnetic disk 1 because of the heat-assisted recording.

Figure 2:
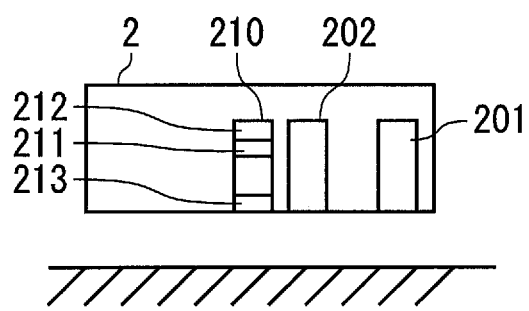
FIG. 2 is a schematic sectional view showing detailed description of a structure of a head.

Next, the structure of the head 2 which has been described above with reference to FIG. 1 will be described in detail with reference to FIG. 2. FIG. 2 is a schematic sectional view showing a detailed description of a structure of the head 2.

As shown in FIG. 2, the head 2 is provided with a read head 201 as the reading portion, a write head 202 as the recording portion, and a light-emitting unit 210.

In the magnetic disk 1 of the HDD 10, the recording film is made of a material that is high in coercive force in ordinary temperature. Therefore, as described above, the HDD 10 employs the heat-assisted recording in which information is recorded magnetically by lowering the coercive force at a recording position by increasing the temperature of the recording position with optical heat assistance. That is, not only the write head 202 but also the light-emitting unit 210 contributes to information recording on the magnetic disk 1. Therefore, the write head 202 and the light-emitting unit 210 constitute the recording portion.

The read head 201 is an element for reading information that is magnetically recorded on the recording surface of the magnetic disk 1. Information that has been read out by the read head 201 is output to the head IC as a read signal.

The write head 202 is an element for producing a magnetic signal (magnetism) according to a write current that is input from the head IC 22 as a write signal. Information is recorded magnetically on the recording surface of the magnetic disk 1 by means of the magnetic signal that is output from the write head 202.

The light-emitting unit 210 is a light-emitting module which is provided with a laser element 211, a photodetector 212, and a condenser element 213. The laser element 211 outputs laser light according to a laser current that is input from the head IC 22 as a write signal. The photodetector 212 is a photoelectric conversion element which receives the laser light that is output from the laser element 211 and converts the laser light into an electrical signal. The thus-converted electrical signal is output to the head IC 22 as a monitor signal. The condenser element 213 is an element for condensing the laser light. The condenser element 213 can be implemented by utilizing the principle of proximity field light of a sphere or hole having a very small diameter. However, the embodiments are not limited to such a case.

As described above, in the HDD 10, information is recorded on the magnetic disk 1 by magnetism that is produced by the write head 202 and heat that is generated by light that is emitted from the light-emitting unit 210.

The configuration that has been described above with reference to FIGS. 1 and 2 is common to plural embodiments described below.

Embodiment 1

Next, light quantity optimization processing for enabling efficient use of the recording area and information recording processing by heat-assisted recording according to a first embodiment which are performed in the HDD 10 will be described with reference to FIG. 3.

Figure 3:
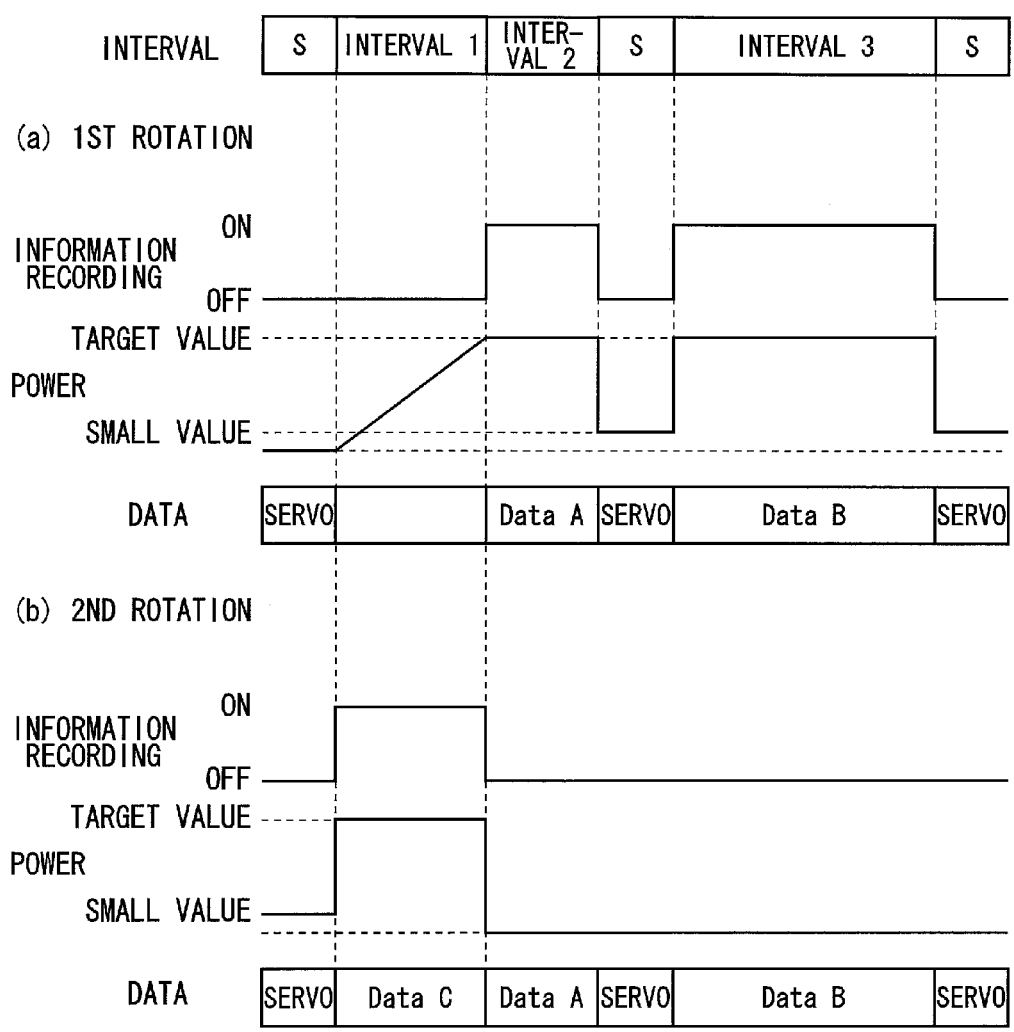
FIG. 3 is a time chart showing description of light quantity optimization processing for enabling efficient use of the recording area and information recording processing by heat-assisted recording according to a first embodiment.

FIG. 3 is a time chart showing description of the light quantity optimization processing for enabling efficient use of the recording area and the information recording processing by heat-assisted recording according to the first embodiment.

In the first embodiment, light quantity optimization processing is performed before execution of information recording processing for recording information on the magnetic disk 1 by the heat-assisted recording. A light quantity optimization processing region (light quantity adjustment region) and an information recording processing position (information recording position) with respect to the light quantity optimization processing region are important features of the first embodiment. In the first embodiment, light quantity optimization processing and information recording processing are performed on the same track of the recording surface of the magnetic disk 1 while the magnetic disk 1 makes two rotations.

In FIG. 3, intervals S are intervals where servo information is recorded in advance of a track of the recording surface of the magnetic disk 1. In the following description, interval S will also be referred to as "servo interval." Pieces of servo information are provided at prescribed intervals on each track of the recording surface of the magnetic disk 1. In general, several hundred pieces of servo information are recorded on one circle of each track. Three servo intervals are shown in FIG. 3 and the whole portion shown in FIG. 3 is just a very small part of the single circle of the track. Intervals "1," "2," and "3" are intervals provided as data regions on the track. Each data region is interposed between servo regions.

Part (s) of 3A shows processing that is performed on the track as the subject of information recording processing during the first rotation. The top part of part (a) shows whether information recording processing is performed or not. "On" means a state that information recording is being performed and "off" means a state that information recording is not being performed. The middle part of part (a) shows the laser light power, which may be any of the controlled power, the output power of the light emitting unit 210, and the output power of the laser element 211 or even other power. That is, the middle part of part (a) shows the relative power of laser light. The bottom part of part (a) shows the content of information recorded or to be recorded in the recording subject track.

An operation according to the first embodiment will be described below. First, in the first rotation, the laser light power is controlled to zero in the servo interval S that is immediately before the interval "1" of the track as the subject of information recording processing. In the servo interval S, the laser light power need not always be set at zero. However, it is known that if the laser light power is higher than a prescribed value, a portion, illuminated by light emitted from the light-emitting unit 210, on the recording surface of the magnetic disk 1 is changed magnetically even in the case where no magnetic signal is output from the write head 202. Therefore, to prevent destruction of servo information, it is necessary to avoid applying laser light whose power is higher than the prescribed value to the recording surface. In other words, servo information is not destroyed even if laser light is applied to the servo intervals on the recording surface as long as its power is lower than the prescribed value.

Then, in the interval "1" that is immediately after the above servo interval S, light quantity optimization processing is performed in which the laser light power is adjusted so as to increase from zero to a target value. For the above-described reason, in the interval "1," the laser light power adjustment need not always be started from zero.

Information recording processing is started from the head of the interval "2" (the end of the interval "1"). Information "Data A" is recorded in interval "2." The information is recorded in the interval "2" by the heat-assisted recording. That is, in the interval "2," the write head 202 outputs a magnetic signal corresponding to information to be recorded on the interval "2" while the light-emitting unit 210 continues outputting laser light at the power that was optimized in the interval "1."

In the servo interval S that is immediately after the interval "2," the light-emitting unit 210 is controlled so as to output laser light at so low power as not to destroy servo information. This is, because it is known in advance that information will be recorded by the heat-assisted recording also in the interval "3" which follows the current interval "2." That is, to allow the laser light power to rise more steeply in the interval "3", it is preferable to continue outputting laser light at so low power as not to affect servo information.

"Data B" is recorded in the interval "3" by the heat-assisted recording. In the interval "3", the laser light port is controlled in the same manner as in the interval "2". Further, in the servo interval S that is immediately after the interval "3," the same control is performed as in the servo interval S that is immediately before the interval "1" or the servo interval S that is immediately before the interval "3." The pieces of processing that are performed on the plural intervals of the track as the subject of the information recording processing during the first rotation have been described above.

Part (b) of FIG. 3 shows processing that is performed on the track as the subject of the information recording processing during the second rotation. The top part, middle part, and bottom part of part (b) show the same kinds of contents as those of part (a).

In the second rotation, in the servo interval S that is immediately before the interval "1" of the track as the subject of the information recording processing, the same control as the control that was performed in one of the servo intervals in the first rotation (see part (a) of FIG. 3) is performed. In the second rotation, for the interval "1" on which the light quantity optimization processing was performed in the first rotation, information recording processing is performed, that is information "Data C" is recorded by the heat-assisted recording. The laser light power is controlled in the same manner as in the intervals "2" and "3" of the first rotation. Upon completion of the information recording processing on the interval "1," the laser light power is lowered to prevent destruction of the information "Data A" which was recorded in the interval "2" in the first rotation. Neither light quantity optimization processing nor information recording processing is performed for the intervals that follow the interval "2."

The light quantity optimization processing for enabling efficient use of the recording area and the information recording processing by the heat-assisted recording according to the first embodiment are performed in the above-described manner. Light quantity optimization processing is performed using a data region, and information recording processing is performed on the same data region later. That is, in the first embodiment, light quantity optimization processing for enabling efficient use of the recording area of the magnetic disk 1 is performed before a start of information recording processing by the heat-assisted recording. As such, the HDD 10 according to the first embodiment can record more information in the entire recording area of the magnetic disk 1 by the heat-assisted recording.

Embodiment 2

Next, light quantity optimization processing for enabling efficient use of the recording area and information recording processing by the heat-assisted recording according to a second embodiment which is performed in the HDD 10 will be described with reference to FIG. 4.

Figure 4:
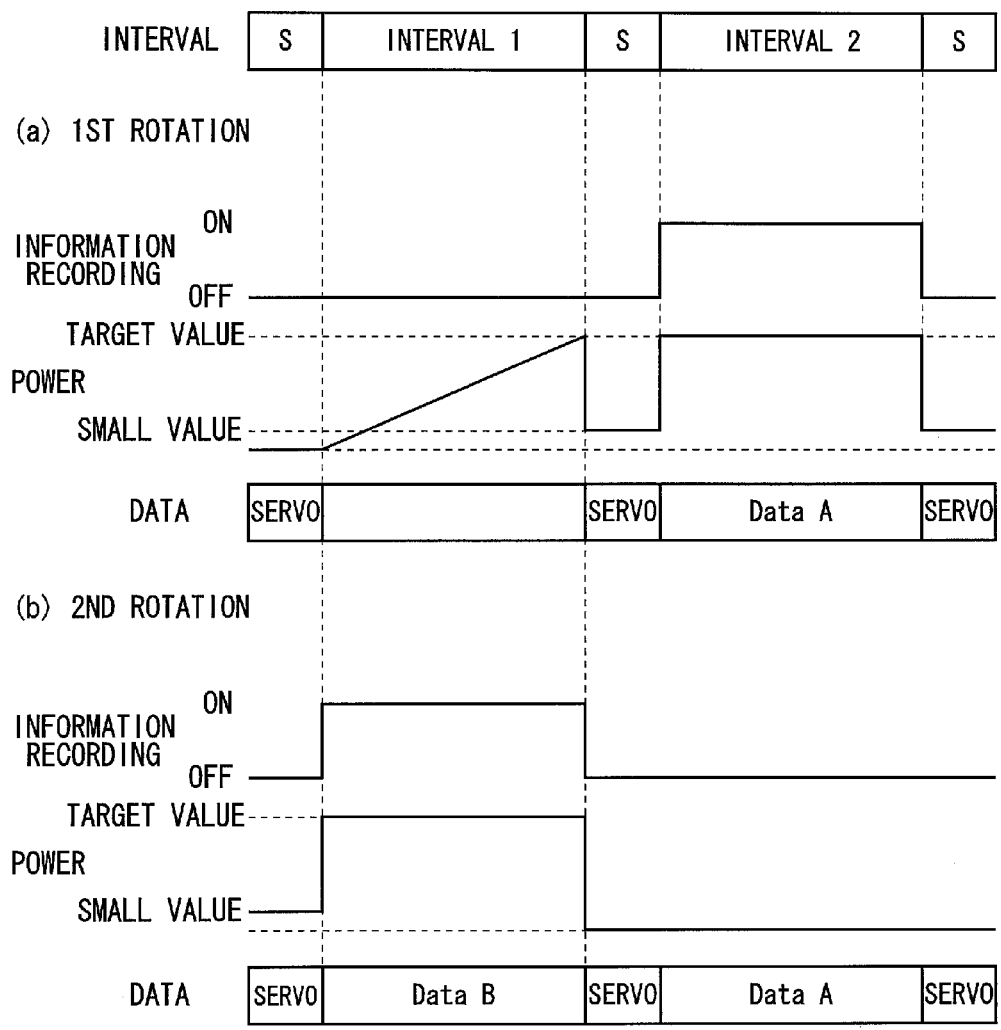
FIG. 4 is a time chart showing description of light quantity optimization processing for enabling efficient use of the recording area and information recording processing by heat-assisted recording according to a second embodiment.

FIG. 4 is a time chart showing description of the light quantity optimization processing for enabling efficient use of the recording area and the information recording processing by the heat-assisted recording according to the second embodiment.

Also in the second embodiment, the light quantity optimization processing is performed before execution of the information recording processing for recording information on the magnetic disk 1 by the heat-assisted recording. The second embodiment is similar to the first embodiment in the light quantity optimization processing region (light quantity adjustment region) and the fact that information recording processing is performed on a region with which light quantity optimization processing was performed. However, the second embodiment is different from the first embodiment in the length of the region with which the light quantity optimization processing is performed (light quantity adjustment region length). Also in the second embodiment, the light quantity optimization processing and the information recording processing are performed on the same track of the recording surface of the magnetic disk 1 while the magnetic disk 1 makes two rotations.

In FIG. 4, three intervals S are intervals where servo information is recorded in advance of a track of the recording surface of the magnetic disk 1. Intervals "1" and "2" are intervals provided as data regions on the track of the recording surface of the magnetic disk 1.

Part (a) of FIG. 4 shows processing that is performed on the track as the subject of information recording processing during the first rotation. The top part, middle part, and bottom part of part (a) of FIG. 4 show the same kinds of contents as those of parts (a) and (b) of FIG. 3.

An operation according to the second embodiment will be described below. First, in the first rotation, the laser light power is controlled to zero in the servo interval S that is immediately before the interval "1" of the track as the subject of information recording processing. In the servo intervals S, the laser light power need not always be set at zero.

Then, in the interval "1" that is immediately after the above servo interval S, light quantity optimization processing is performed in which the laser light power is adjusted so as to increase from zero to a target value. In the interval "1," the laser light power adjustment need not always be started from zero. In the second embodiment, the light quantity optimization processing can be performed in a longer time than in the first embodiment.

In the servo interval S that is immediately after the interval "1," the light-emitting unit 210 is controlled so as to output laser light at so low power as not to destroy servo information. In the servo interval S, although the laser light power may be set at zero, it is preferable to continue outputting laser light at so low power as not to destroy servo information.

Information recording processing is started from the head of the interval "2" (the end of the servo interval S). Information "Data A" is recorded in the interval "2." Information is recorded in the interval "2" by heat-assisted recording. That is, in the interval "2," the write head 202 outputs a magnetic signal corresponding to information to be recorded while the light-emitting unit 210 continues outputting laser light at the power that was optimized in the interval "1."

Also in the servo interval S that is immediately after the interval "2," the light-emitting unit 210 is controlled so as to output laser light at so low power as not to destroy servo information.

Part (b) of FIG. 4 shows processing that is performed on the track as the subject of the information recording processing during the second rotation. The top part, middle part, and bottom part of part (b) show the same kinds of contents as those of part (a).

In the second rotation, in the servo interval S that is immediately before the interval "1" of the track as the subject of the information recording processing, the same control as the control that was performed in one of the servo intervals S in the first rotation (see part (a) of FIG. 4) is performed. In the second rotation, for the interval "1" on which the light quantity optimization processing was performed in the first rotation, information recording processing is performed, that is information "Data B" is recorded by the heat-assisted recording. The laser light power is controlled in the same manner as in the interval "2" of the first rotation. Upon completion of the information recording processing on the interval "1," the laser light power is lowered to prevent destruction of the servo information that recorded in the servo interval S located immediately after the interval "1." Neither light quantity optimization processing nor information recording processing is performed for the intervals that follow this servo interval S.

The light quantity optimization processing for enabling efficient use of the recording area and the information recording processing by the heat-assisted recording according to the second embodiment are performed in the above-described manner. The light quantity optimization processing is performed with high accuracy using a longer data region and the information recording processing is performed on the same data region later. That is, in the second embodiment, the light quantity optimization processing for enabling efficient use of the recording area of the magnetic disk 1 is performed before a start of the information recording processing by the heat-assisted recording. As such, the HDD 10 according to the second embodiment can also record more information in the entire recording area of the magnetic disk 1 by the heat-assisted recording.

Embodiment 3

Next, light quantity optimization processing for enabling efficient use of the recording area and information recording processing by heat-assisted recording according to a third embodiment which is performed in the HDD 10 will be described with reference to FIG. 5.

Figure 5:
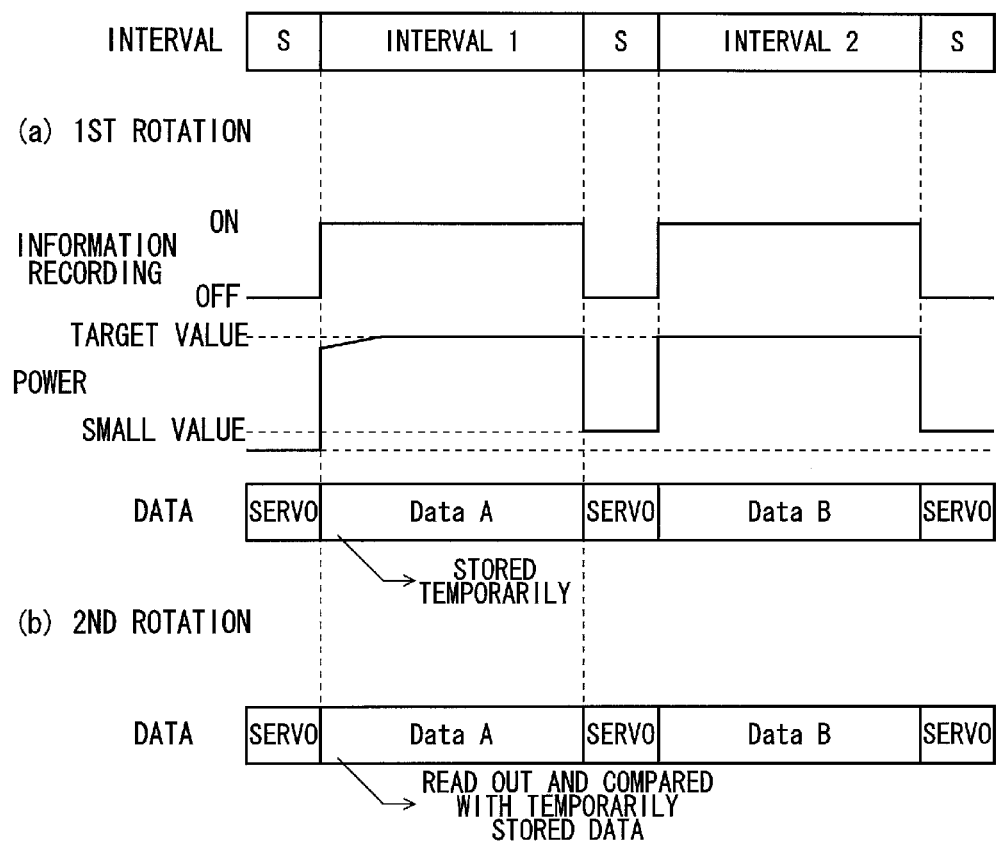
FIG. 5 is a time chart showing description of light quantity optimization processing for enabling efficient use of the recording area and information recording processing by heat-assisted recording according to a third embodiment.

FIG. 5 is a time chart showing description of the light quantity optimization processing for enabling efficient use of the recording area and the information recording processing by the heat-assisted recording according to the third embodiment.

In the third embodiment, the light quantity optimization processing is performed parallel with the information recording processing for recording information on the magnetic disk 1 by the heat-assisted recording. The third embodiment is similar to the first embodiment in the light quantity optimization processing region (light quantity adjustment region). However, the third embodiment is different from the first embodiment in that the light quantity optimization processing is performed parallel with the information recording processing, and that data that was recorded in a data region with which the light quantity optimization processing was performed is checked after the above information recording processing. In the third embodiment, basically, the light quantity optimization processing and the information recording processing are performed on the same track of the recording surface of the magnetic disk 1 while the magnetic disk 1 makes one rotation.

In FIG. 5, three intervals S are intervals where servo information is recorded in advance of a track of the recording surface of the magnetic disk 1. Intervals "1" and "2" are intervals provided as data regions on the track of the recording surface of the magnetic disk 1.

Part (a) of FIG. 5 shows processing that is performed on the subject track of the information recording processing during the first rotation. The top part, middle part, and bottom part of part (a) of FIG. 5 show the same kinds of contents as those of parts (a) and (b) of FIGS. 3 and 4.

An operation according to the third embodiment will be described below. First, in the first rotation, the laser light power is controlled to zero in the servo interval S that is immediately before the interval "1" of the track as the subject of information recording processing. In the servo intervals S, the laser light power need not always be set at zero.

Then, in the interval "1" that is immediately after the above servo interval S, light quantity optimization processing is performed in which the laser light power is adjusted so as to increase to a target value from a value that is smaller than the target value by a prescribed value but large enough for heat-assisted recording. Furthermore, parallel with the light quantity optimization processing, information "Data A" is recorded in the interval "1" from its head. In the parallel processing period, the information recording processing is performed by the heat-assisted recording although the laser light power is not optimized. That is, the write head 202 outputs a magnetic signal corresponding to information to be recorded in the interval "1" while the light-emitting unit 210 outputs laser light at a power value that is being determined by the ongoing optimization processing or an optimum power value that has just been determined by the optimization processing. The information "Data A" has been recorded in the interval "1" is also stored in a storage location other than the interval "1." The storage location other than the interval "1" may be any of another storage area of the magnetic disk 1, the NVRAM 43, and the RAM 42. Where the information "Data A" is also stored in another storage area of the magnetic disk 1, it is preferable that the recording be performed after completion of the light quantity optimization processing.

In the servo interval S that is immediately after the interval "1," the light-emitting unit 210 is controlled so as to output laser light at so low power as not to destroy servo information. In the servo interval S, although the laser light power may be set at zero, it is preferable to continue outputting laser light at so low power as not to destroy servo information.

In the interval "2," information "Data B" is recorded by the heat-assisted recording. The laser light power is controlled to the optimum power value that was determined in the interval "1." That is, in the third embodiment, both of the light quantity optimization processing and the information recording processing are performed while the magnetic disk 1 makes one rotation. Also in the servo interval S that is immediately after the interval "2," the light-emitting unit 210 is controlled so as to output laser light at so low power as not to destroy servo information.

Part (b) of FIG. 5 shows processing that is performed during the second rotation on the track on which the information recording processing has been performed. In the third embodiment, the recorded information is read out in the second rotation.

In the second rotation, in the servo interval S that is immediately before the interval "1" of the track on which the information recording processing has been performed, the same control as the control that was performed in one of the servo intervals S in the first rotation (see part (a) of FIG. 5) is performed. In the second rotation, for the interval "1" on which both of the light quantity optimization processing and the information recording processing were performed in the first rotation, the information "Data A" which is recorded in the interval "1" is read out. The information "Data A" that is read from the interval "1" is compared with the information "Data A" that is stored temporarily in the storage location other than the interval "1." If the comparison shows no difference, it is determined that the information "Data A" is stored normally in the interval "1" and neither light quantity optimization processing nor information recording processing is performed for the intervals that follow the interval "1" in the second rotation.

On the other hand, if the comparison shows a difference, it is determined that the information "Data A" is not stored normally. In a third rotation, the information "Data A" that is stored temporarily in the storage location other than the interval "1" is recorded in the interval "1" by heat-assisted recording. The laser light power is controlled to the optimum power value that was determined in the interval "1". Neither light quantity optimization processing nor information recording processing is performed for the intervals that follow the interval "1."

The light quantity optimization processing for enabling efficient use of the recording area and the information recording processing by the heat-assisted recording according to the third embodiment are performed in the above-described manner.

Next, the procedure of the light quantity optimization processing and the information recording processing according to the third embodiment that have been described above in FIG. 5 will be described with reference to FIG. 6.

Figure 6:
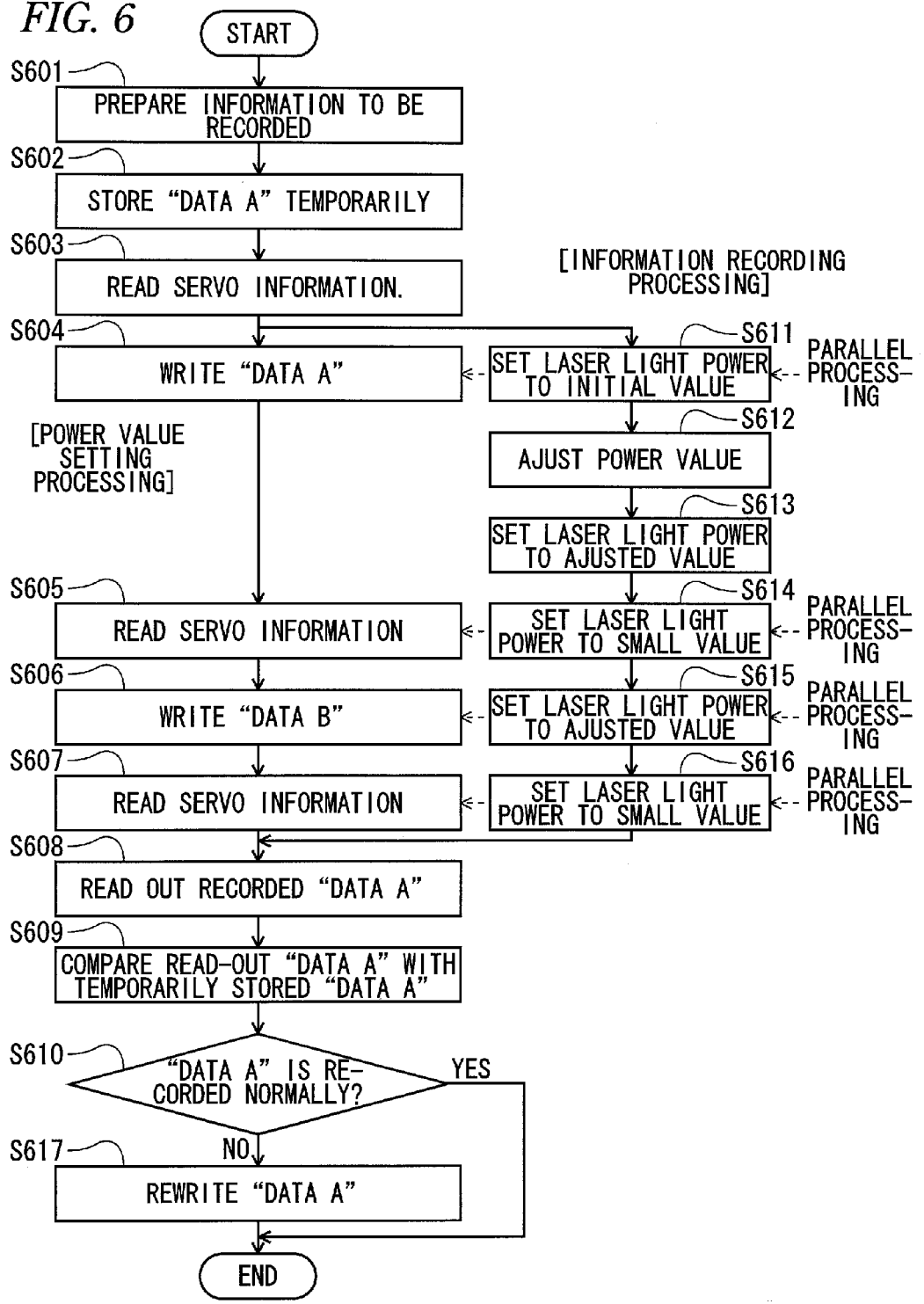
FIG. 6 is a flowchart showing the procedure of the light quantity optimization processing and the information recording processing according to the third embodiment shown in FIG. 5.

FIG. 6 is a flowchart showing the procedure of the light quantity optimization processing and the information recording processing according to the third embodiment that have been described in FIG. 5. As shown in FIG. 5, in the third embodiment, light quantity optimization processing is performed parallel with information recording processing.

At step S601, information "Data A" and "Data B" to be recorded are prepared which have been transmitted from the host device 100 together with a write command. That is, the information "Data A" and "Data B" are buffered in the RAM 42. At step S602, of these information, the information "Data A" which should be recorded in the interval "1" is stored temporarily until information recording processing proceeds to a prescribed step. Steps S601 and S602 are preparatory steps for light quantity optimization processing and information recording processing, and substantive steps start from the next step.

At step S603, in the first rotation, a position (position of the interval "1") where the information "Data A" should be recorded on the recording surface of the magnetic disk 1 is searched for and servo information is read from the servo interval immediately before that position. At step S604, processing of recording the information "Data A" in the interval "1" is started. At the same time as the start of the information recording processing on the interval "1," at step S611, the laser light power is set to a value that is lower than a target value by a prescribed value but large enough for heat-assisted recording. After the power value setting, light quantity optimization processing is performed at step S612. Upon completion of the light quantity optimization processing, at step S613, the laser light power is set to an optimum power value. That is, the light quantity optimization processing is performed parallel with the information recording processing by the heat-assisted recording on the interval "1."

Upon completion of the information recording processing on the interval "1," at step S614, the laser light power is set to so small a value as not to destroy servo information in the servo interval that is immediately after interval "1." At step S605, servo information is read from the servo interval that is immediately after interval "1."

Upon completion of the servo information reading in the servo interval, at step S606, processing of recording the information "Data B" in the interval "2" is started. At the same time as the start of the information recording processing on the interval "2," at step S615, the laser light power is set to the optimum value. That is, information recording processing by heat-assisted recording is performed on the interval "2."

Upon completion of the information recording processing on the interval "2," at step S616, the laser light power is set to so small a value as not to destroy servo information in the servo interval that is immediately after interval "2." At step S607, servo information is read from the servo interval that is immediately after interval "2."

Upon completion of the servo information reading in the servo interval, processing of the second rotation is performed. More specifically, at step S608, the information "Data A" is read from the interval "1." At step S609, the information "Data A" read from the interval "1" is compared with temporarily stored information "Data A." At step S610, it is determined whether or not the comparison result shows a difference, that is, whether or not the information "Data A" is recorded normally in the interval "1." If it is determined that the information "Data A" is recorded normally in the interval "1" (S610: Yes), the light quantity optimization processing and the information recording processing for the interval "1" and the following intervals are finished. On the other hand, if it is determined that the information "Data A" is not recorded normally in the interval "1" (S610: No), the temporarily stored information "Data A" is recorded in the interval "1" at step S617 and the process is finished.

The light quantity optimization processing for enabling efficient use of the recording area and the information recording processing by the heat-assisted recording according to the third embodiment are performed in the above-described manner. In the third embodiment, the information recording processing of recording data in a data region is performed parallel with the light quantity optimization processing. Since the thus-recorded data is checked later, it can be assured that finally recorded data is normal. As such, the HDD 10 according to the third embodiment can also record more information in the entire recording area of the magnetic disk 1 by the heat-assisted recording.

Embodiment 4

Next, light quantity optimization processing for enabling efficient use of the recording area and information recording processing by heat-assisted recording according to a fourth embodiment which is performed in the HDD 10 will be described with reference to FIG. 7.

Figure 7:
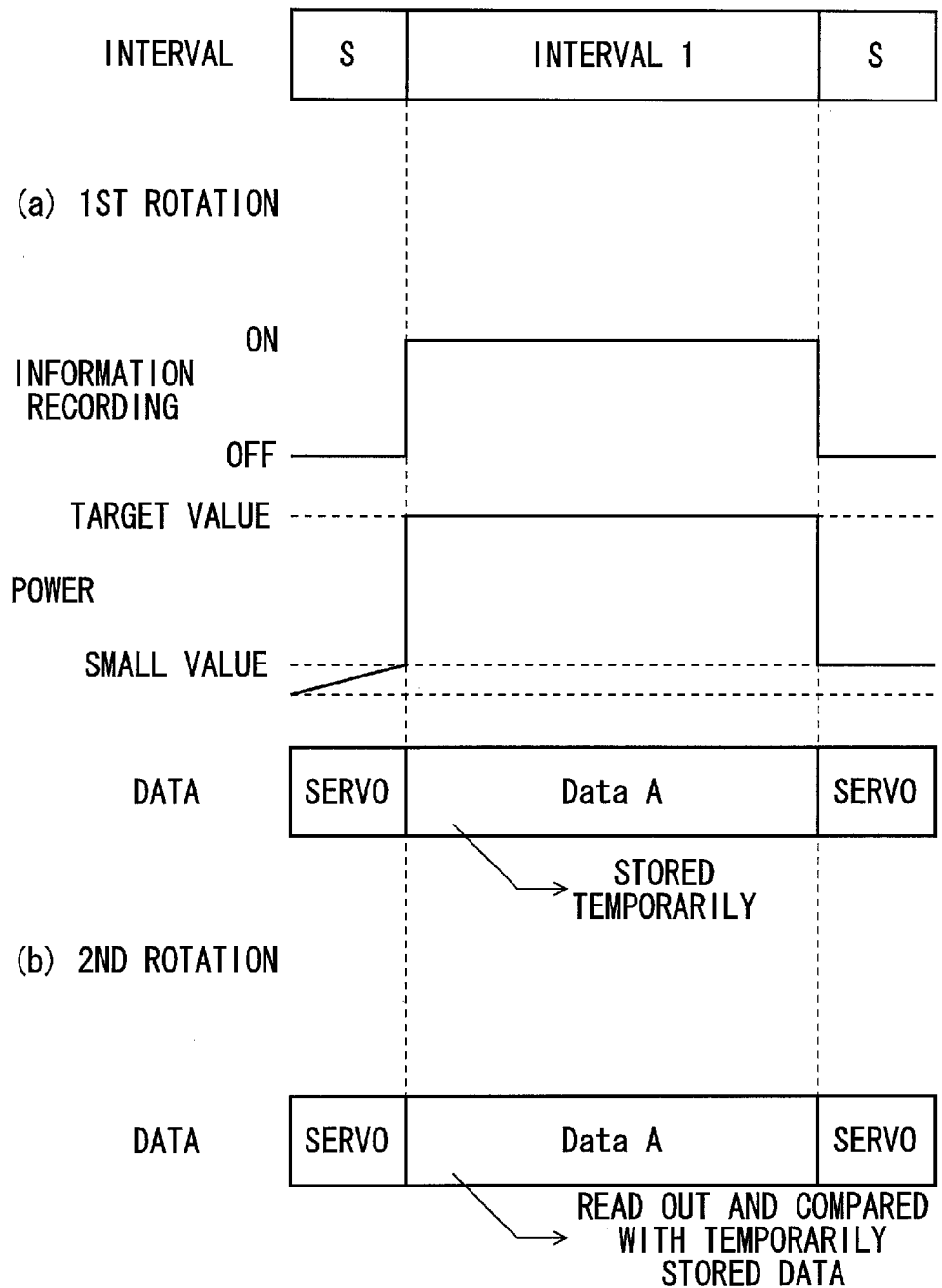
FIG. 7 is a time chart showing description of light quantity optimization processing for enabling efficient use of the recording area and information recording processing by heat-assisted recording according to a fourth embodiment.

FIG. 7 is a time chart showing description of the light quantity optimization processing for enabling efficient use of the recording area and the information recording processing by the heat-assisted recording according to the fourth embodiment.

Also in the fourth embodiment, the light quantity optimization processing is performed parallel with the information recording processing for recording information on the magnetic disk 1 by the heat-assisted recording. The fourth embodiment is similar to the third embodiment in that the light quantity optimization processing is performed parallel with the information recording processing, and that data that was recorded in a data region with which the light quantity optimization processing was performed is checked after the above information recording processing. However, the fourth embodiment is different from the third embodiment in that the light quantity optimization processing region (light quantity adjustment region) includes a servo interval. Also in the fourth embodiment, basically, the light quantity optimization processing and the information recording processing are performed on the same track of the recording surface of the magnetic disk 1 while the magnetic disk 1 makes one rotation. Therefore, in the following description, features that are different than in the third embodiment will mainly be described, that is, and similar features will not be described or will be described only briefly.

An operation according to the fourth embodiment will be described below. First, as shown in part (a) of FIG. 7, in the first rotation, rough light quantity optimization processing is performed using the servo interval S that is immediately before the interval "1" of the track as a subject of information recording processing. As described above, in the servo intervals S, it is necessary to control the laser light power to so small a value that the servo information recorded there is not destroyed. Therefore, rough light quantity optimization processing is performed using the servo interval at a power value within such a range that the servo information recorded there is not destroyed. For example, a power value that is outside that range and close to a target optimum power value can be predicted by making measurements with two power values, that is, a power value "0" and a power value that is a little smaller than the maximum value of that range.

Then, in the interval "1" that is immediately after the above servo interval S, light quantity optimization processing is performed in which the laser light power is adjusted until reaching a target value starting from the value that was predicted by the adjustment using the above servo interval S. That is, high-accuracy light quantity optimization processing is performed in the interval "1" while the rough light quantity optimization processing was performed in the above servo interval. Furthermore, parallel with the light quantity optimization processing, information "Data A" is recorded in the interval "1" from its head. Pieces of processing to be performed hereafter will not be described in detail. In short, the original information "Data A" is stored temporarily and, in the second rotation, compared with the information "Data A" stored in the interval "1."

The light quantity optimization processing for enabling efficient use of the recording area and the information recording processing by the heat-assisted recording according to the fourth embodiment are performed in the above-described manner. In the fourth embodiment, information recording processing of recording data in a data region is performed parallel with high-accuracy light quantity optimization processing in the same data region after rough light quantity optimization processing was performed using a servo interval. Since the thus-recorded data is checked later, it can be assured that finally recorded data is normal. As such, the HDD 10 according to the fourth embodiment can also record more information in the entire recording area of the magnetic disk 1 by heat-assisted recording.

Embodiment 5

Next, light quantity optimization processing for enabling efficient use of the recording area and information recording processing by heat-assisted recording according to a fifth embodiment which is performed in the HDD 10 will be described with reference to FIG. 8.

Figure 8:
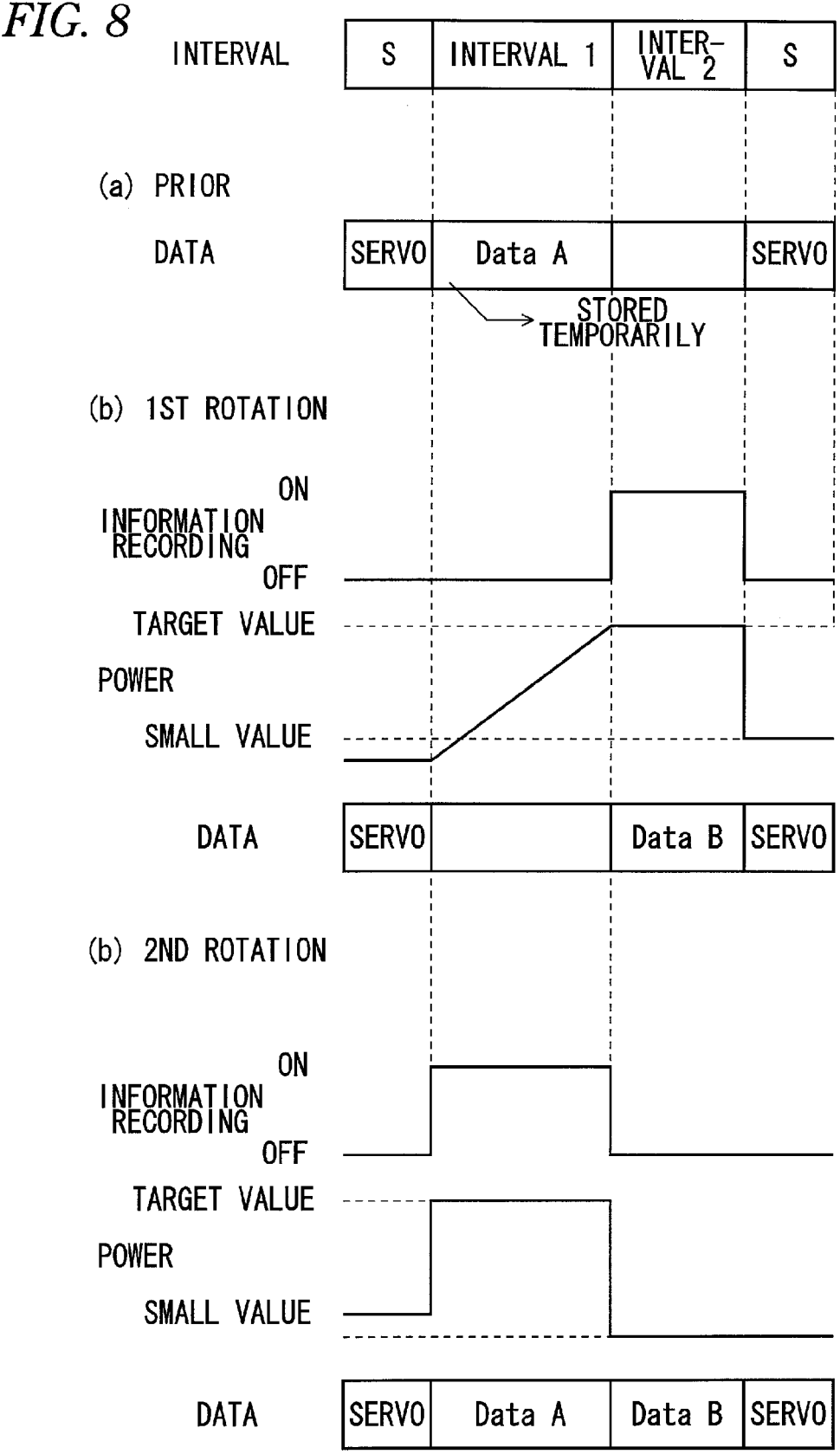
FIG. 8 is a time chart showing description of light quantity optimization processing for enabling efficient use of the recording area and information recording processing by heat-assisted recording according to a fifth embodiment.

FIG. 8 is a time chart showing description of the light quantity optimization processing for enabling efficient use of the recording area and the information recording processing by the heat-assisted recording according to the fifth embodiment.

Also in the fifth embodiment, as in the first and second embodiments, light quantity optimization processing is performed before execution of information recording processing for recording information on the magnetic disk 1 by heat-assisted recording. The fifth embodiment is similar to the first and second embodiments in the light quantity optimization processing region (light quantity adjustment region) and the fact that information recording processing is performed on a region with which light quantity optimization processing was performed. The fifth embodiment is also similar to the third and fourth embodiments in that temporarily stored data is recorded again in a region with which the light quantity optimization processing was performed. However, the fifth embodiment is different from the first to fourth embodiment in that data is already recorded in a light quantity optimization processing region (light quantity adjustment region). Also in the fifth embodiment, the light quantity optimization processing and the information recording processing are performed on the same track of the recording surface of the magnetic disk 1 while the magnetic disk 1 makes two rotations. Therefore, in the following description, features that are different than in the above-described embodiments will be described in detail, that is, and similar features will not be described or will be described only briefly.

An operation according to the fifth embodiment will be described below. As shown in part (a) of FIG. 8, information "Data A" is already recorded in the interval "1." Therefore, first, the information "Data A" which is recorded in the interval "1" is read out before a start of light quantity optimization processing. The read-out information "Data A" is temporarily stored in a storage location other than the interval "1." Light quantity optimization processing and information recording processing are performed from the next rotation.

Part (b) of FIG. 8 shows pieces of processing that are performed on the subject track in the first rotation. In the first rotation, after the servo interval S that is immediately before the interval "1" is passed, light quantity optimization processing is performed on the interval "1" in which the information "Data A" is recorded. This is done in the same manner as in the first embodiment. Then, information recording processing is started and information "Data B" is recorded in the interval "2" by heat-assisted recording. The servo interval S that is immediately after the interval "2" is passed to complete the pieces of processing of the first rotation.

Part (c) of FIG. 8 shows pieces of processing that are performed on the subject track in the second rotation. After the servo interval S that is immediately before the interval "1" is passed in the second rotation, information recording processing is performed on the interval "1." That is, the information "Data A" that is temporarily stored in the storage location other than the interval "1" is recorded in the interval "1." That is, the information "Data A" has been recorded in the interval "1" again. The interval "2" which follows the interval "1" and the servo interval S that is immediately after the interval "2" are passed to complete the pieces of processing of the second rotation.

The light quantity optimization processing for enabling efficient use of the recording area and the information recording processing by the heat-assisted recording according to the fifth embodiment are performed in the above-described manner. In the fifth embodiment, data that is read from a data region is stored temporarily and then light quantity optimization processing is performed in the data region. Then, information recording processing is performed to record the temporarily stored data again in the region with which the light quantity optimization processing was performed. That is, in the fifth embodiment, the light quantity optimization processing for enabling efficient use of the recording area of the magnetic disk 1 is performed before a start of the information recording processing by the heat-assisted recording. As such, the HDD 10 according to the fifth embodiment can also record more information in the entire recording area of the magnetic disk 1 by the heat-assisted recording.

In the fifth embodiment, the light quantity optimization processing for enabling efficient use of the recording area is performed using a data region and the information recording processing by the heat-assisted recording is performed. That is, the light quantity optimization processing is performed first using a data region and then the information recording processing is performed on the region with which the light quantity optimization processing was performed. That is, in the fifth embodiment, the light quantity optimization processing for enabling efficient use of the recording area of the magnetic disk 1 is performed before a start of the information recording processing by the heat-assisted recording. As such, the HDD 10 according to the fifth embodiment can also record more information in the entire recording area of the magnetic disk 1 by heat-assisted recording.

While certain embodiment has been described, the exemplary embodiment has been presented by way of example only, and is not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording device comprising:
    a magnetic recording medium comprising data regions for data recording;
    a light emitter configured to output an optical signal and apply the optical signal to a recording position of the data regions;
    a write head configured to magnetically record the recording data at the recording position, the light emitter being configured to providing heat assistance for the recording by the write head; and
    a controller configured to adjust a light quantity value of the optical signal by outputting the optical signal from the light emitter to the recording position, to cause the light emitter to apply the adjusted optical signal, and
    to record a data to the recording position to be used for adjusting the light quantity value after adjustment of the light quantity value of the optical signal.

2. The device of claim 1, wherein the controller is configured to start adjusting the light quantity of the optical signal based on a light quantity value which is heat-assisted at the recording position.

3. A controller of a magnetic recording device comprising a magnetic recording medium comprising data regions for data recording, a light emitter configured to output an optical signal and apply the optical signal to a recording position of the data regions, and a write head configured to magnetically record the recording data at the recording position, the light emitter being configured to provide heat assistance for the recording by the write head, the controller comprising:
    a light quantity setting module configured to set a light quantity value of the optical signal output from the light emitter; and
    a control module configured to adjust the light quantity value of the optical signal by outputting the optical signal from the light emitter to the recording position,
    to cause the light emitter to apply the adjusted optical signal, and to record a data to the recording position to be used for adjusting the light quantity value after adjustment of the light quantity value of the optical signal.

4. A method of magnetically recording on a magnetic recording device comprising a magnetic recording medium comprising data regions for data recording, a light emitter configured to output an optical signal and apply the optical signal to a recording position of the data regions, and a write head configured to magnetically record the recording data at the recording position, the method comprising:
    setting a light quantity value of the optical signal output from the light emitter;
    applying the optical signal with the set light quantity value;
    magnetically recording data with the write head at the recording position, the light emitter providing heat assistance for the recording by the write head;
    adjusting the set light quantity value of the optical signal by outputting the optical signal from the light emitter to the recording position;
    recording a data to the recording position after adjustment of the light quantity value of the optical signal.

5. The method of claim 4 further comprising starting an adjustment of the light quantity of the optical signal based on a light quantity value which is heat-assisted at the recording position.

6. The device of claim 1, wherein a data recorded on the recording position previously is temporarily stored in a storage other than the recording position of the magnetic recording medium before adjustment of the light quantity value of the optical signal by using the recording position.

7. The device of claim 6, wherein the data stored temporarily before the adjustment of the light quantity value is recorded to the recording position after the adjustment of the light quantity value.

8. The device of claim 1, wherein the controller is configured to adjust a light quantity value of the optical signal by outputting the optical signal from the light emitter to the recording position, in parallel with recording the data on the recording position.

9. The device of claim 8,
    wherein the data recorded to the recording position is checked after the adjustment of the light quantity value.

10. The device of claim 1,
    wherein a data to be recorded is temporarily stored in a storage other than the recording position of the magnetic recording medium before adjustment of the light quantity value of the optical signal by using the recording position,
    wherein the adjustment of the light quantity value by using the recording position is performed after storing the data,
    wherein the data is recorded on the recording position after the adjustment of the light quantity value, and
    wherein the data recorded to the recording position is checked after recording the data.

11. The controller of claim 3, wherein a data recorded on the recording position previously is temporarily stored in a storage other than the recording position of the magnetic recording medium before adjustment of the light quantity value of the optical signal by using the recording position.

12. The controller of claim 11, wherein the data stored temporarily before the adjustment of the light quantity value is recorded to the recording position after the adjustment of the light quantity value.

13. The controller of claim 3, wherein the control module is configured to adjust a light quantity value of the optical signal by outputting the optical signal from the light emitter to the recording position, in parallel with recording the data on the recording position.

14. The controller of claim 13,
wherein the data recorded to the recording position is checked after the adjustment of the light quantity value.

15. The controller of claim 3,
wherein a data to be recorded is temporarily stored in a storage other than the recording position of the magnetic recording medium before adjustment of the light quantity value of the optical signal by using the recording position,
wherein the adjustment of the light quantity value by using the recording position is performed after storing the data,
wherein the data is recorded on the recording position after the adjustment of the light quantity value, and
wherein the data recorded to the recording position is checked after recording the data.

16. The method of claim 4 further comprising temporarily storing the data which is recorded on the recording position previously in a storage other than the recording position of the magnetic recording medium before adjustment of the light quantity value of the optical signal by using the recording position.

17. The method of claim 16 further comprising recording the data stored temporarily before the adjustment of the light quantity value to the recording position after the adjustment of the light quantity value.

18. The method of claim 4, wherein the adjusting the light quantity value of the optical signal is performed by outputting the optical signal from the light emitter to the recording position, in parallel with recording the data on the recording position.

19. The method of claim 18 further comprising checking the data recorded to the recording position is checked after the adjustment of the light quantity value.

20. The method of claim 4 further comprising:
temporarily storing a data to be recorded in a storage other than the recording position of the magnetic recording medium before adjustment of the light quantity value of the optical signal by using the recording position,
performing the adjustment of the light quantity value by using the recording position after storing the data,
recording the data on the recording position after the adjustment of the light quantity value, and
checking the data recorded to the recording position after recording the data.

\* \* \* \* \*